United States Patent
Roe et al.

(10) Patent No.: US 7,441,334 B2
(45) Date of Patent: Oct. 28, 2008

(54) EXHAUST SYSTEM WITH SPIN-CAPTURE RETENTION OF AFTERTREATMENT ELEMENT

(75) Inventors: Thomas O. Roe, Stoughton, WI (US); Steven P. Ziebell, Stoughton, WI (US)

(73) Assignee: Fleetguard, Inc., Nashville, TN (US)

( * ) Notice: Subject to any disclaimer, the term of this patent is extended or adjusted under 35 U.S.C. 154(b) by 554 days.

(21) Appl. No.: 11/119,947

(22) Filed: May 2, 2005

(65) Prior Publication Data

US 2006/0245986 A1 Nov. 2, 2006

(51) Int. Cl.
  B21D 51/16 (2006.01)
  B21D 39/00 (2006.01)
  B23P 11/00 (2006.01)
  B01D 50/00 (2006.01)

(52) U.S. Cl. ............... 29/890; 29/505; 29/515; 29/520; 422/177; 422/179; 60/299

(58) Field of Classification Search ............ 29/890, 29/520, 515, 505; 422/177, 179; 60/299; 55/523, 525, 529
See application file for complete search history.

(56) References Cited

U.S. PATENT DOCUMENTS

| | | | |
|---|---|---|---|
| 3,887,741 A | 6/1975 | Dwyer | |
| 4,144,627 A | 3/1979 | Noda et al. | |
| 4,269,807 A | 5/1981 | Bailey et al. | |
| 4,364,761 A | 12/1982 | Berg et al. | |
| 4,417,908 A | 11/1983 | Pitcher, Jr. | |
| 4,504,294 A | 3/1985 | Brighton | |
| 5,073,432 A | 12/1991 | Horikawa et al. | |
| 5,080,953 A | 1/1992 | Horikawa et al. | |
| 5,145,539 A | 9/1992 | Horikawa et al. | |
| 5,453,116 A | 9/1995 | Fischer et al. | |
| 5,488,826 A | 2/1996 | Paas | |
| 5,555,621 A | 9/1996 | Tanabe et al. | |
| 5,782,089 A * | 7/1998 | Machida et al. | 60/299 |
| 6,162,403 A * | 12/2000 | Foster et al. | 422/173 |
| 6,293,010 B1 * | 9/2001 | Umin et al. | 29/890 |
| 6,312,490 B1 | 11/2001 | Lippert et al. | |
| 6,701,617 B2 * | 3/2004 | Li et al. | 29/890 |
| 6,726,884 B1 * | 4/2004 | Dillon et al. | 422/179 |
| 6,769,281 B2 | 8/2004 | Irie et al. | |
| 7,323,030 B2 * | 1/2008 | Andersen et al. | 55/502 |
| 2004/0081594 A1 * | 4/2004 | Li et al. | 422/179 |
| 2008/0056966 A1 * | 3/2008 | Sarsfield | 422/177 |

* cited by examiner

*Primary Examiner*—David P. Bryant
*Assistant Examiner*—Alexander P Taousakis
(74) *Attorney, Agent, or Firm*—Andrus, Sceales, Starke & Sawall, LLP; J. Bruce Schelkopf

(57) ABSTRACT

A spin-capture retention system engages and retains a thermally expanding mat, stabilizer and exhaust aftertreatment element in an exhaust system, and provides secure axial and radial location, and provides protective sealing of the mat.

5 Claims, 3 Drawing Sheets

EXHAUST SYSTEM WITH SPIN-CAPTURE RETENTION OF AFTERTREATMENT ELEMENT

BACKGROUND AND SUMMARY

The invention relates to exhaust systems, and more particularly to improvements in the capture of an exhaust aftertreatment element such as a catalytic converter or exhaust filter.

Catalytic converter elements and exhaust filter elements are used in harsh environments. The temperature in the exhaust system cycles from ambient temperature to elevated temperatures near the exhaust gas temperature. Furthermore, vibration is induced from the engine and the vehicle or equipment that is being operated. These temperature and vibration considerations present a challenge to adequately capture an aftertreatment element, typically into a sheet metal housing in the exhaust system.

Existing aftertreatment devices typically use a ceramic fiber mat that contains vermiculite, which is known to expand with increasing temperature. The expanding mat is compressed against the element radially to provide holding force to keep the element from moving axially relative to the sheet metal body shell. The shell in turn is trapped axially within the muffler housing by an end flange. In some environments, the expanding mat may not provide sufficient holding force to keep the aftertreatment element from moving axially. In one solution known in the prior art, a stabilizer is provided by a wire mesh or rope around the aftertreatment element at the end of the expanding mat, and the sheet metal body shell is dubbed radially inwardly thereover and beyond the axial end of the element to trap and axially retain the stabilizer and the mat and the aftertreatment element. The latter dubbed-over design has improved durability as compared to the expanding mat-only design.

Commonly owned co-pending U.S. patent application Ser. No. 10/202,126, filed Jul. 24, 2002, addresses and solves a problem which was found and whose source was identified in the above noted dubbed-over design. It was found that the aftertreatment element in the dubbed-over design was still subject to movement due to the heat and/or vibration of the exhaust system. The source of this problem was identified as the dubbed sheet metal body shell itself being subject to opening up, i.e. radial outward movement, due to the heat and/or vibration of the exhaust system, which in turn allows the above noted undesirable axial movement of the stabilizer and/or mat and/or aftertreatment element. The noted opening-up problem of the dubbed-over end was solved by preventing radial outward deformation or opening-up thereof, by incorporation of a dub-retainer engaging and retaining the dubbed end of the sheet metal body shell and preventing radial outward deformation thereof otherwise caused by heat or vibration in the exhaust system.

The present invention provides another solution to the above noted problems.

DETAILED DESCRIPTION

Figure 1:
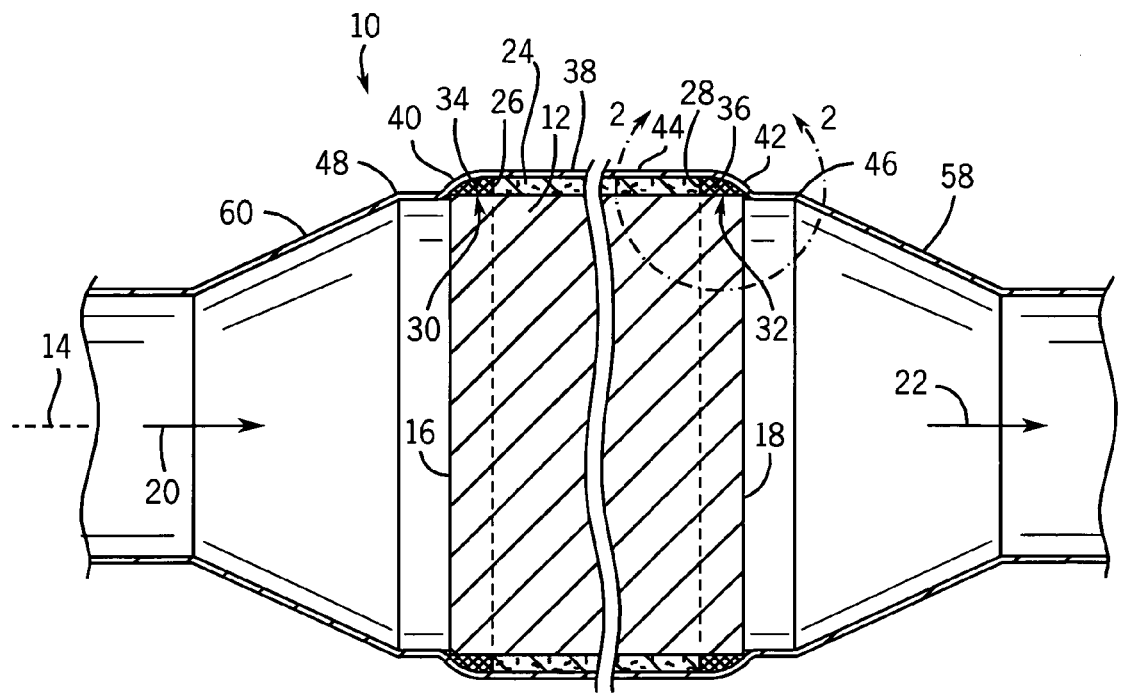
FIG. 1 is a side sectional view of an exhaust system in accordance with the invention.

FIG. 1 shows an exhaust system 10 having an exhaust aftertreatment element 12, for example a catalytic converter and/or exhaust filter, for passing exhaust axially therethrough along axis 14 between first and second distally opposite axial ends 16 and 18, as shown at inlet and outlet flow arrows 20 and 22. A thermally expanding mat 24, for example a ceramic fiber mat containing vermiculite, is around element 12 and has first and second distally opposite axial ends 26 and 28, at least one and preferably both of which ends are axially spaced from a respective one of the ends 16 and 18 of element 12 by respective axial gaps 30 and 32. Stabilizers 34 and 36, each preferably wire mesh or a wire or knitted rope, are provided around element 12 and located in respective axial gaps 30 and 32. A housing 38, preferably sheet metal, is around mat 24 and stabilizers 34 and 36 and extends axially beyond at least one and preferably both of ends 16 and 18 of element 12. The housing has stabilizing sections 40 and 42, FIGS. 1, 2, around respective stabilizers 34 and 36.

Figure 2:
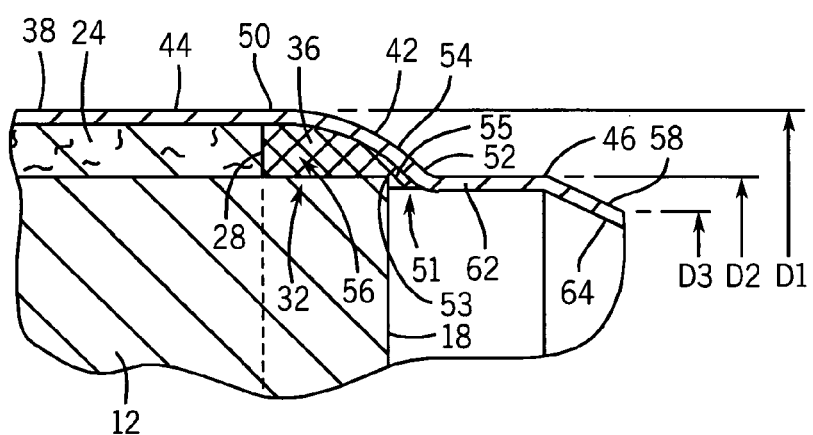
FIG. 2 is an enlarged view of a portion of FIG. 1 as shown at 2-2.

Referring to FIG. 2, housing 38 has a main section 44 of a first diameter D1 around mat 24 and extending axially in a first axial direction (e.g. leftwardly in FIG. 2) from stabilizing section 42. The housing has a duct section 46 of a second diameter D2 extending axially in a second axial direction (e.g. rightwardly in FIG. 2) from stabilizing section 42. The noted second axial direction is opposite to the noted first axial direction. The noted second diameter D2 is smaller than the noted first diameter D1. The inlet end of the housing (left end in FIG. 1) is preferably comparable, and has a duct section 48 of a smaller diameter than the noted first diameter D1 of main section 44 and extending axially leftwardly in FIG. 1 from stabilizing section 40. In the preferred embodiment, main section 44 and stabilizing sections 40 and 42 and duct sections 46 and 48 are a single unitary member.

Stabilizing section 42, FIG. 2, has a first axial end 50 merging with main section 44, a second axial end 52 merging with duct section 46, and a spun-reduction diameter portion 54 spanning between first and second axial ends 50 and 52 of stabilizing section 42 and both: a) radially biasing stabilizer 36 inwardly toward element 12 at end 18 of the element; and b) axially biasing stabilizer 36 leftwardly in FIG. 2 toward mat 24 at end 28 of the mat. In the preferred embodiment, there is a slight gap 51 between corner 53 of element 12 and axial end 52 of stabilizing section 42 of the housing. Mesh or rope 36 is pinched in such gap 51 between corner 53 and axial end 52 of stabilizing section 42 of the housing, as shown at pinched portion 55 of the mesh or rope 36. Housing 38 and element 12 and mat 24 define a triangular shaped cavity 56 in cross-section at axial gap 32. The triangular shaped cavity is defined by a first side provided by stabilizing section 42 of the housing, a second side provided by element 12 extending axially leftwardly in FIG. 2 from end 18 of the element to end 28 of mat 24, and a third side provided by end 28 of mat 24 extending radially outwardly from element 12 to the housing at the noted first axial end 50 of stabilizing section 42 of the housing.

Housing 38 has a second spun-reduction diameter portion 58, FIGS. 1, 2, spanning along duct section 46 and providing diameter D3 less than diameter D2. In one embodiment, spun-reduction diameter portion 58 reduces diameter along a continuous taper tapering radially inwardly as it extends rightwardly in FIGS. 1 and 2. The other end of the housing on the inlet side may likewise have a spun-reduction diameter portion 60 reducing diameter along a continuous taper tapering radially inwardly as it extends leftwardly in FIG. 1. The spinning process, to be described, not only provides the noted capture retention and radial and axial bias on stabilizing members 34, 36, but also enables the provision of long cones as at 58 and 60 which are deemed advantageous for improved flow distribution, particularly for large diameter elements 12.

In the embodiment shown in FIG. 2, duct section 46 of the housing has a first portion 62 of diameter D2 extending axially rightwardly from axial end 52 of stabilizing section 42 of the housing, and has a second portion 64 extending axially rightwardly and radially inwardly from first portion 62. Second portion 64 is a second spun-reduction diameter portion. Second spun-reduction diameter portion 64 and first spun-reduction diameter portion 54 are axially spaced by first portion 62 of duct section 46 of the housing therebetween, which portion 62 has the noted diameter D2.

Figure 3:
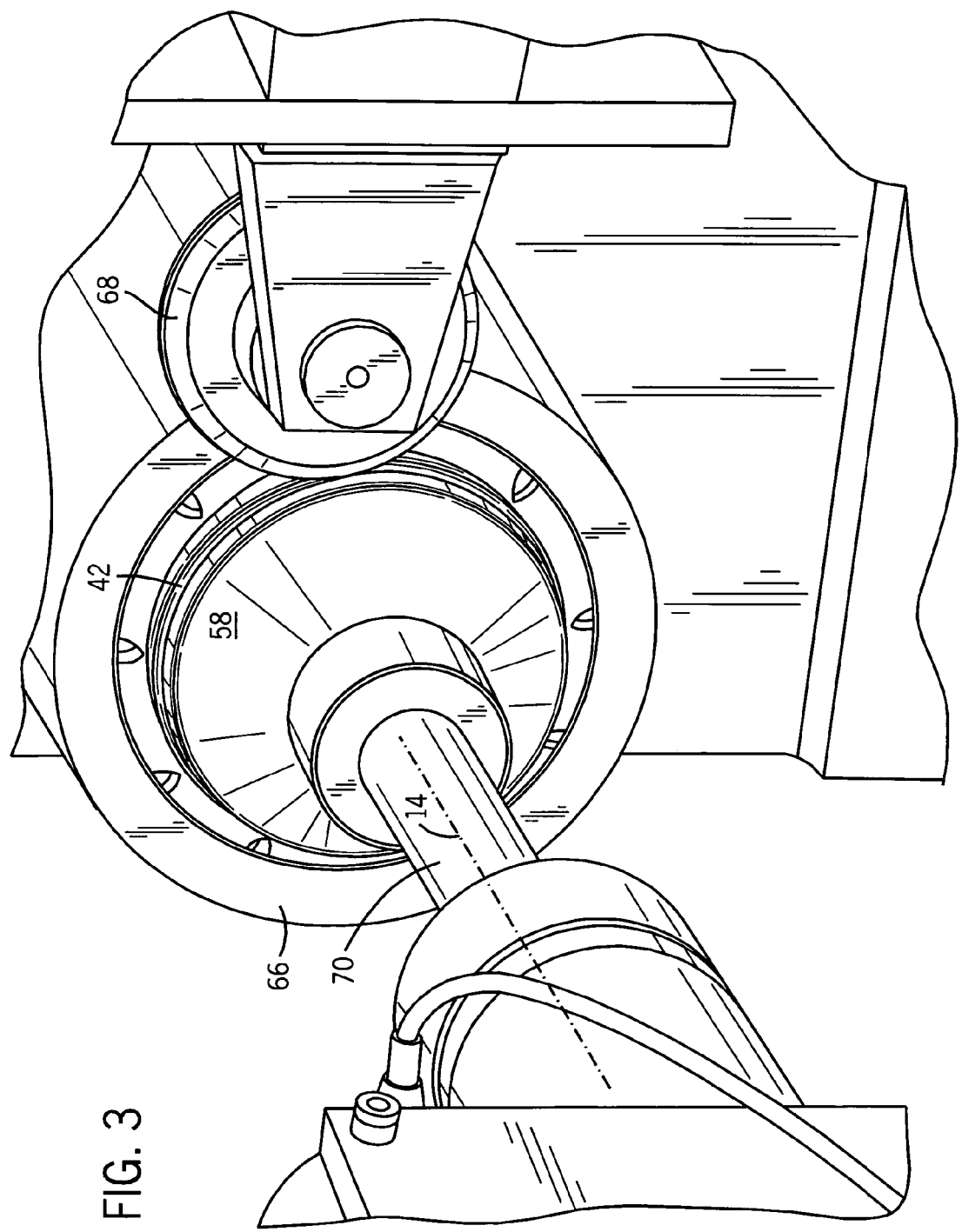
FIG. 3 is a perspective view illustrating spin-forming in accordance with the invention.

FIG. 3 illustrates the preferred method for making the exhaust system described above. Element 12 and mat 24 and stabilizers 34 and/or 36 are stuffed axially into housing 38 prior to the above noted diameter reductions of the housing. The housing is then loaded into a sleeve 66 for rotation therein. During spinning of the housing, a roller ram 68 is axially moved therealong and radially moved inwardly to perform the noted spin-reductions as commanded, including at spin-reduction diameter portion 42 and spin-reduction diameter portion 58. Mandrel 70 may be moved axially rightwardly in FIG. 3 into a position to support the inlet and/or outlet throat during spin-reduction.

Figure 4:
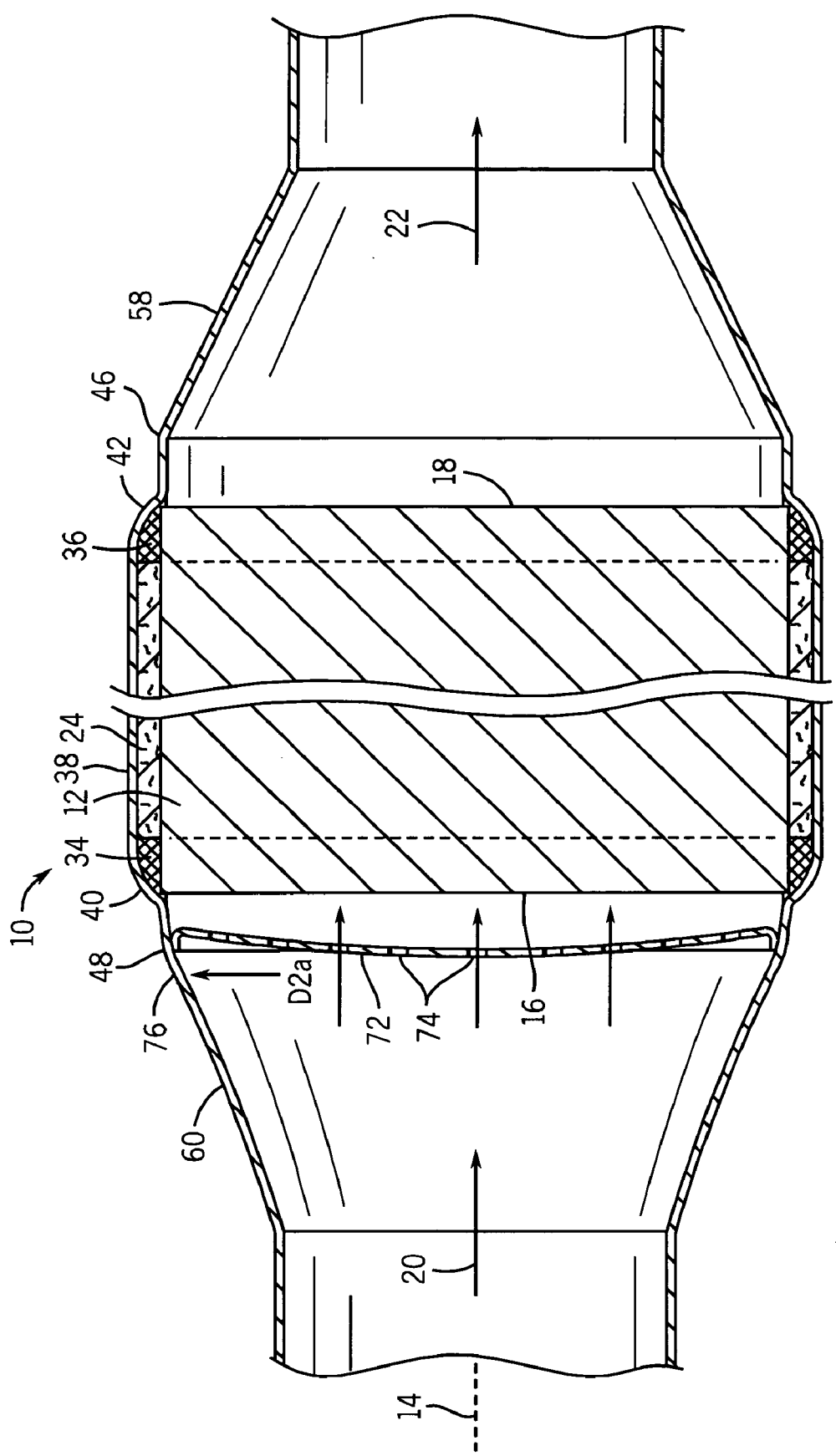
FIG. 4 is a side sectional view of an alternate embodiment.

FIG. 4 shows a further embodiment, and uses like reference numerals from above where appropriate to facilitate understanding. A flow diffuser plate 72, having a plurality of flow apertures 74 therethrough, is provided in inlet duct section 48. Housing 38 has a spun-reduction diameter portion 76 spanning along duct section 48 at flow diffuser plate 72 to mechanically secure and lock the flow diffuser plate in place in the duct section. Spun-reduction diameter portion 60 spans along the duct section on the opposite axial side of flow diffuser plate 72 from element 12. Spun-reduction diameter portion 76 is axially spaced between spun-reduction diameter portions 40 and 60. Spun-reduction diameter portion 76 provides a diameter D2a less than diameter D2. Spun-reduction diameter portion 60 provides diameter D3 less than diameter D2a.

In another aspect, in addition to the noted desirable retention characteristics, the system provides desirable sealing of mat 24 against air flow impingement and against contamination by soot and the like.

It is recognized that various equivalents, alternatives and modifications are possible within the scope of the appended claims.

What is claimed is:

1. A method for making an exhaust system, comprising providing a housing extending axially along an axis, inserting an exhaust aftertreatment element and a mat and a stabilizer into said housing, said exhaust aftertreatment element having first and second distally opposite axial ends for passing exhaust axially therethrough, said mat being disposed around said element and having first and second distally opposite axial ends, at least one of said ends of said mat being axially spaced from a respective one of said ends of said element by an axial gap, said stabilizer being disposed around said element and located in said gap, said housing extending axially beyond said one end of said element, providing said housing with a stabilizing section around said stabilizer, a main section of a first diameter around said mat and extending axially in a first axial direction from said stabilizing section, and a duct section of a second diameter extending axially in a second axial direction from said stabilizing section, said second axial direction being opposite to said first axial direction, said second diameter being smaller than said first diameter, providing said main, stabilizing and duct sections as a single unitary member, said stabilizing section having a first axial end merging with said main section, and a second axial end merging with said duct section, forming said stabilizing section by spin-reducing the diameter of a portion thereof to provide a spun-reduction diameter portion spanning between said first and second axial ends of said stabilizing section and both: a) radially bias said stabilizer inwardly toward said element at said one end of said element; and b) axially bias said stabilizer in said first axial direction toward said mat at said one end of said mat, forming said stabilizing section by spin-reducing the diameter thereof such that said housing and said element and said mat define a triangular shaped cavity in cross-section at said axial gap, and defining said triangular shaped cavity by a first side provided by said stabilizing section of said housing, a second side provided by said element extending axially in said first axial direction from said one end of said element to said one end of said mat, and a third side provided by said one end of said mat extending radially outwardly from said element to said housing at said first axial end of said stabilizing section of said housing.

2. The method according to claim 1 comprising spin-reducing said housing at a second spun-reduction diameter portion spanning along said duct section and providing a third diameter less than said second diameter.

3. The method according to claim 1 wherein said duct section of said housing has a first portion of said second diameter extending axially in said second axial direction from said second axial end of said stabilizing section of said housing, and a second portion extending axially in said second axial direction and radially inwardly from said first portion, and comprising spin-reducing said housing along a second spun-reduction diameter portion along said second portion of said duct section axially spaced from said first mentioned spun-reduction diameter portion along said stabilizing section, said second spun-reduction diameter portion and said first spun-reduction diameter portion being axially spaced by said first portion of said duct section of said housing therebetween of said second diameter.

4. A method for making an exhaust system, comprising providing a housing extending axially along an axis, inserting an exhaust aftertreatment element and a mat and a stabilizer into said housing, said exhaust aftertreatment element having first and second distally opposite axial ends for passing exhaust axially therethrough, said mat being disposed around said element and having first and second distally opposite axial ends, at least one of said ends of said mat being axially spaced from a respective one of said ends of said element by an axial gap, said stabilizer being disposed around said element and located in said gap, said housing extending axially beyond said one end of said element, providing said housing with a stabilizing section around said stabilizer, a main section of a first diameter around said mat and extending axially in a first axial direction from said stabilizing section, and a duct section of a second diameter extending axially in a second axial direction from said stabilizing section, said second axial direction being opposite to said first axial direction, said second diameter being smaller than said first diameter, providing said main, stabilizing and duct sections as a single unitary member, said stabilizing section having a first axial end merging with said main section, and a second axial end merging with said duct section, forming said stabilizing section by spin-reducing the diameter of a portion thereof to provide a spun-reduction diameter portion spanning between said first and second axial ends of said stabilizing section and both: a) radially bias said stabilizer inwardly toward said element at said one end of said element: and b) axially bias said stabilizer in said first axial direction toward said mat at said one end of said mat, providing a flow diffuser plate in said duct section, and spin-reducing said housing at a second spun-reduction diameter portion spanning along said duct section at said flow diffuser plate to mechanically secure said flow diffuser plate in place in said duct section.

5. The method according to claim 4 comprising spin-reducing said housing at a third spun-reduction diameter portion spanning along said duct section on the opposite axial side of said flow diffuser plate from said element, said second spun-reduction diameter portion being axially between said first and third spun-reduction diameter portions, said second spun-reduction diameter portion providing a third diameter less than said second diameter, said third spun-reduction diameter portion providing a fourth diameter less than said third diameter.

* * * * *